(No Model.)

M. B. LEONARD.
ELECTRIC HEATER.

No. 414,714. Patented Nov. 12, 1889.

WITNESSES:
Frank S. Ober
Wm A. Rosenbaum

INVENTOR
Michael B. Leonard
BY
W. B. Johnston
ATTORNEY.

UNITED STATES PATENT OFFICE.

MICHAEL B. LEONARD, OF RICHMOND, VIRGINIA.

ELECTRIC HEATER.

SPECIFICATION forming part of Letters Patent No. 414,714, dated November 12, 1889.

Application filed July 9, 1889. Serial No. 316,954. (No model.)

*To all whom it may concern:*

Be it known that I, MICHAEL B. LEONARD, a citizen of the United States, residing in Richmond, in the county of Henrico and State of Virginia, have invented certain new and useful Improvements in Electric Heaters, of which the following is a specification.

My invention relates to an electric heater and to a switch of novel construction which is adapted to be interposed in the feeder-wires between the generator of electricity and a group of heaters supplied with current therefrom and which completes the circuit from the generator to one and another of the heaters in rapid succession.

My improved heater comprises a box or case which is filled with some insulating heat-retaining substance, in which there is embedded a conductor of high specific resistance, or, as it is sometimes called in this art, a "heating-resistance." When this conductor is coupled up in circuit with a generator of electricity, the heat developed will be conducted to the radiating-surface of the box or case, and thence dissipated into the atmosphere, thereby affording a source of heat which can be regulated with great ease and nicety, and which is capable of wide ranges of temperature.

The object of the commutating-switch, which constitutes the second part of my invention, is to be able to supply a number of independent heaters or sets of heaters from a single generator and to shift the supply-circuit from one heater to another in rapid succession. Thus it will be seen that the heat is generated in each heater, not by a continuous but by an intermittent supply of current, the soapstone or other similar material serving to retain the heat from one impulse of the current to the next, and in this way an important advance has been made in the economy of an electric-heating system, for it furnishes means for subdividing the heating effects of currents of great strength. The switch rotates rapidly, being driven by any preferred type of motor; and it consists in general of two conducting sleeves or surfaces which are in circuit with the opposite poles of the generator and insulated from each other. Arranged upon the sleeves are a series of contact-makers which engage sets of brushes in circuit with the different heaters, respectively.

My invention is illustrated in the accompanying drawings, wherein—

Figure 1:
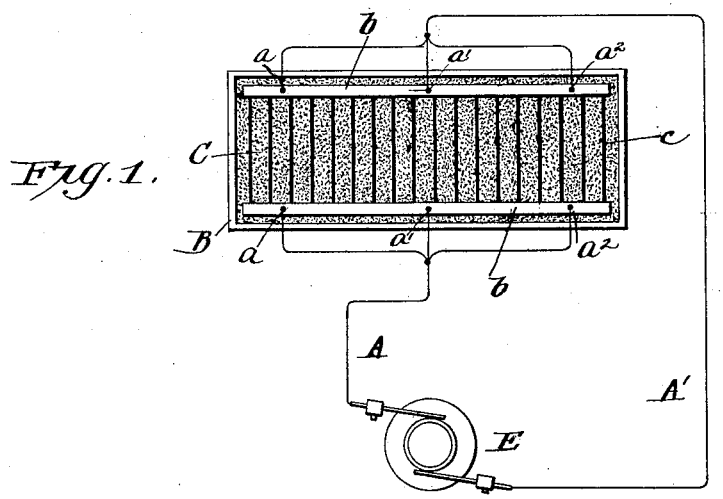
Figure 2:
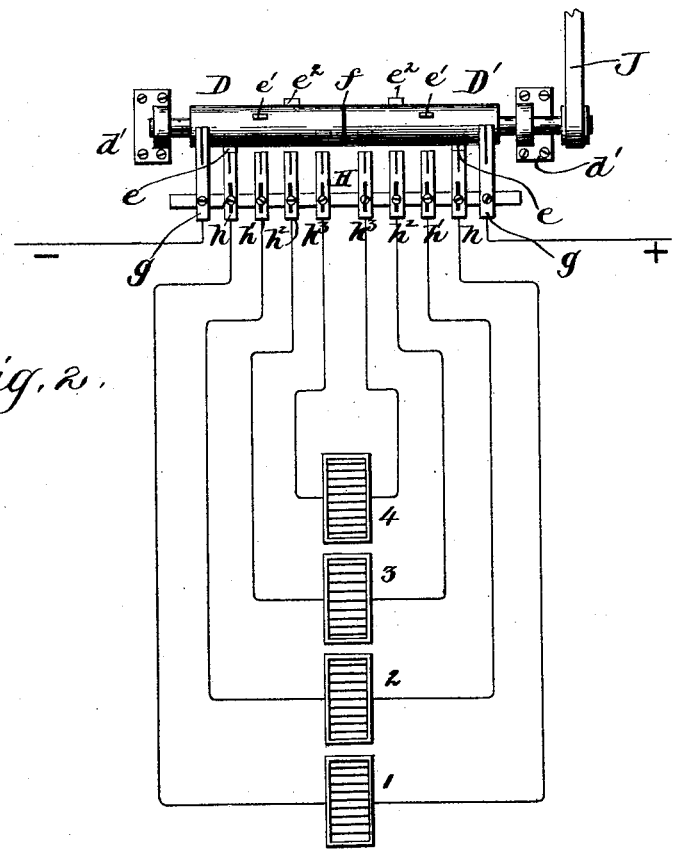

Figure 1 is a plan view of the heater with one side of the case and a slab removed, and Fig. 2 shows the commutating-switch and electric connections as arranged for a group of four heaters.

B is a metallic box or case, which will ordinarily be made of cast-iron and comparatively shallow. This box contains two solid slabs of soapstone C or other heat-retaining material, between which are placed or held a heating-resistance, which, as herein shown, consists of a number of carbon strips $c$, flat and stamped out to whatever thickness may be found desirable. These strips are laid parallel in the box between the slabs and are connected up electrically in multiple arc to two longitudinal conductors $b\ b$, from which, at points $a\ a'\ a^2$, extend feeder-wires A A' to a generator of electricity E, which may be a dynamo or battery, as desired. The heat generated by the passage of the current through the carbon strips is radiated from the metal of the box, and the soapstone, being a poor conductor of heat, prevents sudden changes in the temperature when the current is intermitted.

The commutating-switch, Fig. 2, rotates in suitable bearings $d\ d'$, and consists of a wooden cylinder over which there are fitted two brass or other conducting-sleeves D D', upon which are mounted contact-makers $e\ e'\ e^2$ out of line with each other. These sleeves are insulated from one another at $f$ and are in circuit with the feeder-wires A A' through brushes $g\ g'$, bearing upon the peripheries of the sleeves. H is an insulated brush-holder located near the sleeves, and to this are attached brushes $h\ h\ h'\ h'\ h^2\ h^2$, &c., which are in circuit, respectively, with four heaters 1 2 3 4. As shown in the drawings, contacts $e\ e$ are in engagement with brushes $h\ h$ and the circuit is complete through heater 1, and it will be apparent that as the switch rotates the current will be interrupted in heater 1 and completed through the remaining heaters in rapid succession. For driving the switch the pulley I is shown and a belt J for connection with an electric or other motor. If an electric, it may be supplied from the same source as the heaters themselves.

The number and arrangement of the contact-makers will vary, of course, according to the number of heaters desired, and the brushes may be movable or other means provided for bringing into and out of action the different heaters independently; also, while I have described my particular construction of switch, I am aware that the same function can be obtained by many other forms, and therefore intend to include such forms in so far as they are covered by the claims.

I claim as my invention—

1. The combination, in an electric heater, of a metallic box or case with a heat-retaining material in the form of solid slabs in said box or case, and a heating-resistance consisting of a plurality of carbon conductors placed between or among said slabs of heat-retaining material, substantially as described.

2. The combination, in an electric heater, of a metallic box or case, solid slabs of soapstone contained within said box or case, and heating-resistances in the form of carbon conductors placed between or among the slabs, for the purpose described.

3. The combination of the rotating switch comprising the two conducting-surfaces insulated from each other and adapted to be placed in circuit with the opposite poles of an electrical generator with the projecting contact-makers mounted upon the conducting-surfaces out of line with one another, the brushes, and the electric heaters in circuit with the brushes, whereby each heater is brought successively into circuit with the generator, as described.

4. The combination of the rotating switch comprising the two metallic sleeves insulated from each other and adapted to be included in circuit with the opposite poles of an electrical generator with the contact-makers thereon, the brushes, and translating devices in circuit with the brushes, the contact-makers and brushes being so arranged that the circuit is completed through the different translating devices in succession, substantially as described.

5. The combination, with a rotating switch comprising two conducting-surfaces having projecting contact-makers arranged in a plurality of lines thereupon, of a plurality of contact-brushes adjustably mounted adjacent to the switch in such a manner that they may be thrown into and out of the path of movement of said projecting contact-makers, the said brushes being arranged in couples, each couple forming the terminals of a separate circuit, as and for the purpose set forth.

In witness whereof I have hereunto signed my name in the presence of two subscribing witnesses.

MICHAEL B. LEONARD.

Witnesses:
J. R. DURRETT,
H. R. WAYT.